March 31, 1959     R. B. BURDEN, JR     2,879,862
SECONDARY COMBUSTION DEVICE
Filed Aug. 26, 1957     2 Sheets-Sheet 1
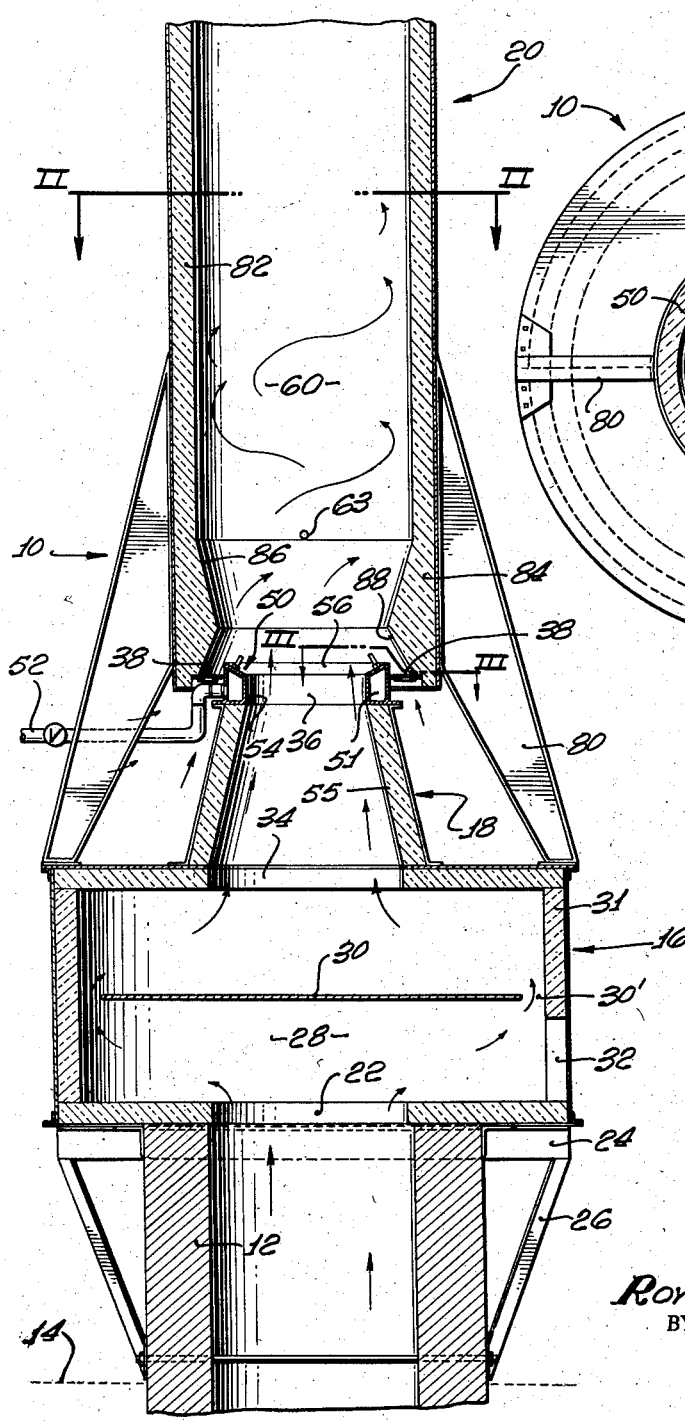
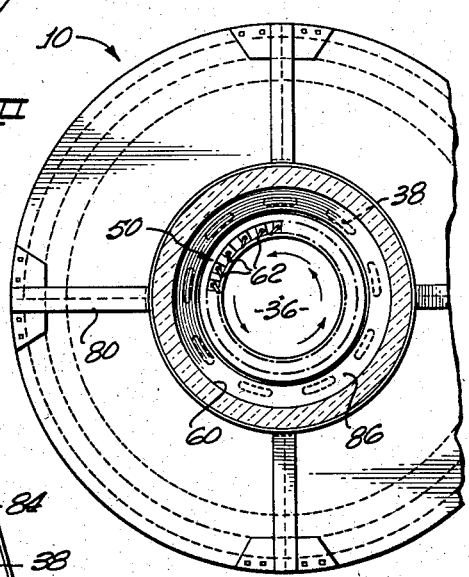
INVENTOR.
ROY B. BURDEN JR.
BY
ATTORNEY

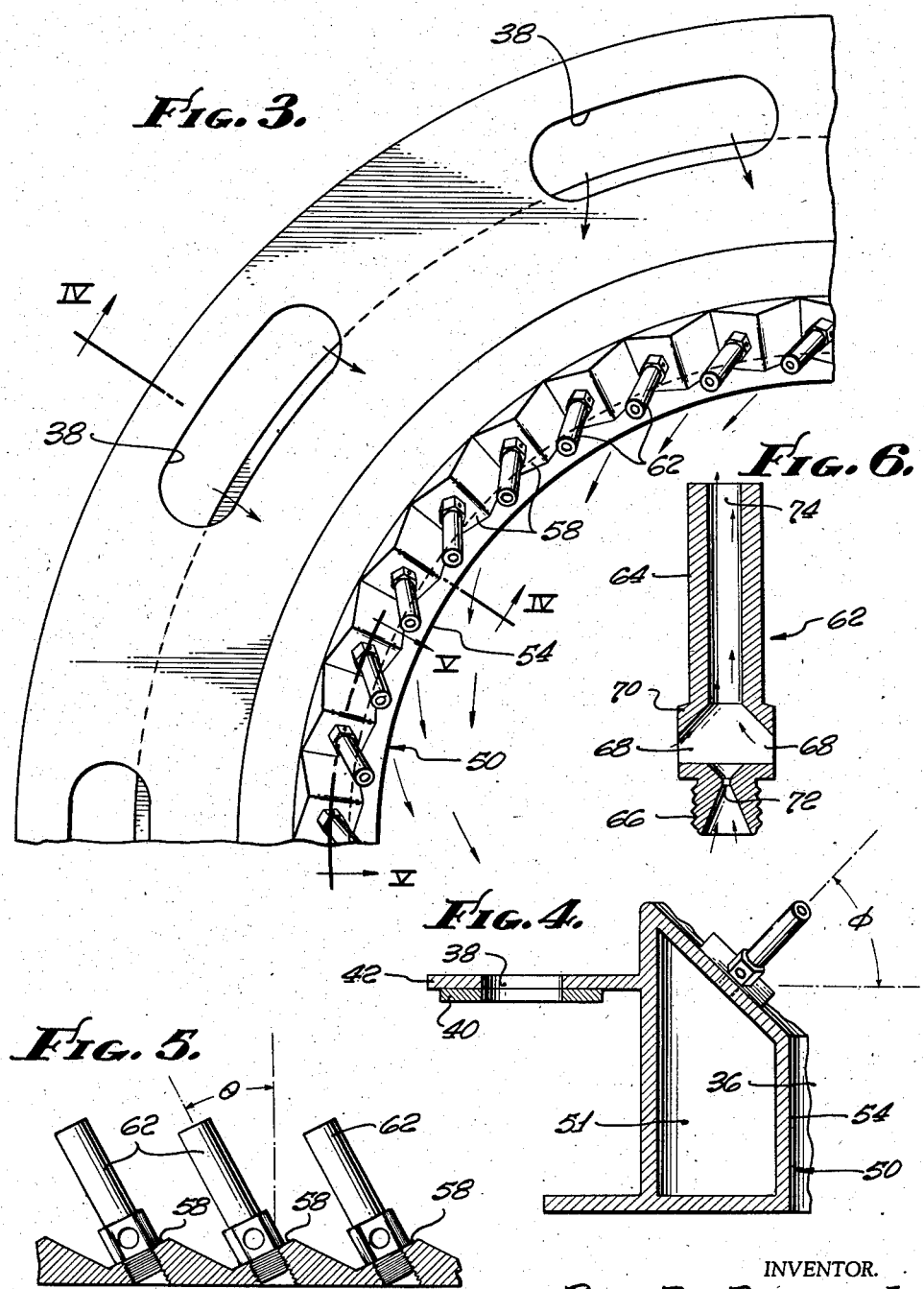

United States Patent Office 2,879,862
Patented Mar. 31, 1959

2,879,862
SECONDARY COMBUSTION DEVICE

Roy B. Burden, Jr., Norwalk, Calif., assignor, by mesne assignments, to Pasadena Investment Co., a corporation Application August 26, 1957, Serial No. 680,148

5 Claims. (Cl. 183—6)

This invention relates to a method and apparatus for the secondary combustion and removal of smoke and the contaminants normally found in flue gases. More particularly the invention relates to improvements in afterburners adapted for use with primary combustion devices, such as incinerators and the like, by which the emission of "smog"-producing products of incomplete combustion may be effectively inhibited.

As the nation's population has tended, increasingly, to concentrate in large centers of business and industrial activity, "smog," "industrial haze" and other evidences of air pollution have received widespread attention. Accordingly, most cities and municipalities of any size now have responsible departments or groups (such as the Air Pollution Control District of Los Angeles) whose primary concern is with smoke, fumes, waste gases, and other causes of air pollution, both visible and invisible. Frequently these groups are empowered to take all reasonable steps necessary to the prevention and the eventual elimination of the causes of air pollution, even though substantial individual hardship may result. For example, it is estimated that in Los Angeles county alone some 17,000 apartment house incinerators are in direct violation of standards established by the Air Pollution Control authorities. The owners of these buildings must either replace existing equipment or risk prosecution for continued violation of district regulations.

The present invention provides for the first time a low-cost afterburner device, adapted for use with existing stack constructions, by which the secondary combustion of smoke and other visible and invisible products of combustion normally found in flue gases may be economically accomplished. It provides for the first time a mode of operating an afterburner device wherein use is made of a rapidly whirling luminous flame in a zone capable of completely occupying and blanketing the exit flow path of flue gases. Moreover, this mode of operation, by assuring a rate of ascent of flue gases through the flame zone that is substantially less than the rates normally attained, provides a unique prolonged, intimate contact of the flame with the unwanted contaminants. As a consequence, it provides for the first time an afterburner apparatus capable of effecting virtually complete secondary combustion of escaping flue gases. It also provides a series of annularly spaced burner jets within an escape orifice by which a flue outlet may be completely blanketed with an upwardly whirling luminous gas flame. Other objects and advantages of the present invention will be apparent from the following detailed description of a specific embodiment thereof and from the drawings, in which:

Fig. 1 is a vertical section through an exemplary afterburner device embodying the invention;

Fig. 2 is a fragmentary view in horizontal section along the line II—II of Fig. 1;

Fig. 3 is an enlarged fragmentary view in horizontal section along the line III—III of Fig. 1;

Fig. 4 is a view in vertical section along the line IV—IV of Fig. 3;

Fig. 5 is a detailed view along the line V—V of Fig. 3; and

Fig. 6 is a view in section of one of the burner jet elements illustrated in Figs. 1 to 5.

In its broadest aspect, the present invention relates to a process of secondary combustion adapted to the removal of smoke and other combustion products normally found in flue gases, including the steps of first expanding contaminant laden flue gases to decrease flow velocities and cause settling of entrained particular matter, and thereafter increasing flow velocities while simultaneously subjecting the flue gases to secondary combustion in the presence of hydrocarbon gases and air. In carrying out the secondary combustion, the intermixed gases and air are rapidly whirled through a virtually fixed luminous flame zone to thereby achieve a prolonged contact of the smoke particles and contaminants with the flame, while reducing the rate of ascent of the flue gases to substantially less than the linear rate of movement of such gases. Since the flame zone completely occupies the exit flow path of the flue gases, the emission of smoke, fumes or other "smog"-producing contaminants from the stack is effectively inhibited.

To accomplish the process of the invention, wall means are provided which define a vertically extending flow path for the flue gases leading through an orifice and into the rapidly whirling flame zone. The whirling effect within the flame zone is preferably produced by a plurality of spaced-apart burner or jet elements positioned in the orifice in such manner as to direct the flue gases, air and combustible hydrocarbon gases upwardly in a substantially helical flow path that completely occupies the exit flow path of the flue gases. Oxygen for the combustion is provided by aperture means surrounding the orifice to provide an annular inlet adjacent the entering jets of combustible gas. The apparatus employed also includes means to ignite the combustible gases and preferably means to adjust the amount of air entering through the annular inlet.

Turning now to the drawings in detail, Fig. 1 illustrates an afterburner 10 particularly adapted for use with existing stack constructions such as is represented by the incinerator stack 12 extending above the roofline 14. Preferably, the afterburner comprises three main portions, an expansion section 16, an orifice or secondary mixing section 18 and a combustion section 20. Although the present invention is described with particular reference to its use as a secondary combustion device for incineration, as with apartment house incinerators and the like, it will be understood that it has application to any system of primary combustion that involves flue gases containing incompletely combusted material.

The expansion section 16 is conveniently supported adjacent the top opening 22 of the stack 12, as by angle and gusset supports 24 and 26, so that contaminant laden flue gases rising from the stack expand through the opening 22 into an expansion chamber 28 defined by the enlarged cross sectional area of the section 16. As a result of this expansion, a decrease in the flow velocities of the flue gases occurs. This decrease is from normal velocities of about twenty to sixty feet per second or more to not in excess of ten feet per second, generally to about five to ten feet per second. As a result of this decrease in flow velocity, entrained particulate matter in the flue gases is caused to settle out of the slowly-moving gases. Desirably, a circular baffle 30 of resistant material, such as stainless steel or the like, extends transversely of the expansion chamber to prevent such particulate from being accidently carried upwardly through the expansion section 16. As shown, suitable insulation 31 may be provided interiorly of the expansion section in a manner well known to the art; for example, a commercially available castable lining or similar material. An access opening 32 may also be provided to permit clean-out of the expansion section as necessary.

Supported on the expansion chamber 16 above its outlet 34 is an orifice or secondary mixing section 18. As shown, this section is defined by an insulated frustoconical wall section that tapers upwardly to the orifice at 36. A principal effect of the orifice section is to reestablish the upward flow rate of the flue gases so that rates of flow through the orifice 36 of between about 45 and 60 feet per second are achieved, causing a draft which induces a flow of secondary combustion air inwardly through aperture means 38 provided radially adjacent the orifice. It will be noted (Figs. 3 and 4) that the aperture means provides a substantially annular inlet for combustion air extending all about the orifice 36. If desired, the area of this inlet may be regulated by the provision of adjustable means within the inlet, for example, an apertured plate 40 movable relative to a correspondingly apertured support plate 42. In this way, the amount of air introduced into the after-burner combustion section 20 may at all times be positively controlled.

It is a feature of the present invention that burner means 50 are provided in the orifice 36 between the orifice restriction and the annular air inlet 38. The function of the burner 50 is to introduce combustible hydrocarbon gases into the rapidly moving flue gases in such manner that the gases are rapidly whirled within the combustion section to achieve a prolonged intimate burning contact in a luminous flame zone 60 above the burner. While the theory of operation of the device of the invention is not fully understood, it is believed that this prolonged contact causes a breaking up, both chemically and physically, of contaminant matter passing through the flame, insuring thereby a complete combustion and removal of the undesired contaminant matter from the flue gases.

In the illustrated apparatus, the burner 50 comprises an annular conduit 51 supported at the upper terminus of the mixing section 18 adapted to be supplied with combustible hydrocarbon gases by a suitable gas supply inlet 52. Preferably, the inner wall 54 of the burner constitutes the orifice 36 of the after-burner and consequently is smoothly contoured into the inner wall surface 55 of the inlet or mixing section 18. The upper face 56 of the burner conduit adjacent the orifice is inclined at a substantial angle to the axis of the orifice so as to provide an inward inclination of a series of burner or jet elements 62 arranged in annular spaced relation about the burner 50. Preferably, the angle of inclination $\phi$ (relative to a plane perpendicular to the axis of the orifice, as shown in Fig. 4) should be between about 30° and 60° as this degree of inclination has been found to effectively blanket the combustion area 60 above the orifice with flame, as will be later described in more detail.

As is particularly illustrated in Figs. 3 and 5, the gas jets 62 are positioned on the upper face of the burner by a series of evenly spaced inclined surfaces or steps 58, each mounting a jet element. Preferably the angles of inclination of the surfaces 58 are such that each jet element is disposed at an angle $\theta$ relative to an intersecting diameter of the orifice between about 20° and 30° so that the several elements may act in concert to cause a rapid whirling of the flue gases into the flame zone 60. It will be understood that the exact angles of inclination of the surfaces 58 will depend to some extent upon the degree and inward tilt of the upper face 56 of the burner, and the careful selection of a proper combination of the angles $\phi$ and $\theta$ is quite critical to a proper operation of the burner in creating a flame that completely occupies the zone 60. For example, if either of the angles $\phi$ or $\theta$ is too large, the gases will be caused to whirl about the outer periphery of the flame zone creating a hole in the center through which uncombusted flue gases may pass. On the other hand, if either angle $\phi$ or angle $\theta$ is too small, there will be insufficient spinning of the flue and combustion gases, and consequently an insufficient period of contact of the flue gases with the flame to insure the desired complete combustion of contaminate matter. It has been found, for example, within the ranges given above, that a maximum combustion efficiency is achieved within the flame zone 60 when the angle $\phi$ is approximately 45° and the angle $\theta$ between about 25° and 30°.

Similarly, the diameter of the orifice 36 has been found to be critical to the secondary combustion achieved in the flame zone 60. If the orifice is too small in diameter, the draft in the after-burner will be too great, causing the flue gases to rush upwardly at too fast a rate for the complete burning desired. In contrast, if the orifice diameter is too great, the upward rate of travel of the flue gases will be too slow and the flue gases will back up in the incinerator causing undesired smoking in the incinerator room. Generally it has been found desirable to proportion the diameter of the orifice 36 with respect to the annular opening 30' about the baffle 30 in such manner that the latter bears a ratio to the former of between about 3:1 and 4:1. In any event, the rate of flow of flue gases through the orifice 36 should be between about 45 and 60 feet per second, as before stated.

The burner elements 62 are mounted in the upper plate 56 so as to have fluid communication with the supply of combustible gases in the conduit 51 as is best seen in Figs. 5 and 6. Each element is preferably constructed as a tubular element 64 having a threaded end 66 for engagement in the inclined face 56 of the burner and a pair of air-intake openings 68 in the body portion 70. An orifice 72 at the lower end of the jet element causes a jet of combustible gas to be expelled out of the open end 74 of the element, drawing combustion air in through the openings 68 into admixture with the combustible gases. As a consequence, the jets issuing from the jet elements 62 act in concert to draw additional combustion air in through the annular inlet 38 and to impart a rapid whirling movement to the flue gases and intermixed combustion gases ascending into the flame zone 60. Means preferably including a pilot 63, may be provided for automatically igniting the mixture of hydrocarbon gases and air issuing from the jet elements 62.

In carrying out the invention, the construction of the jet elements 62 should be such that a proper proportion of combustible gases and air for complete combustion of the flue gases be impelled into the combustion zone at 60. While this is primarily a matter of engineering choice in a unit process, it has been found that the desirable proportion of combustible hydrocarbon gas (when using natural gas or propane, for example) is between about 0.5 to 2.0% by volume of the flue gases.

Completing the structure of the after-burner is the combustion section 20. The combustion section 20 may be supported in spaced relation above the orifice 36 in any convenient manner, as by the gusset and strap supports 80. The interior of the section is suitably lined with a castable lining or other insulation material 82 which preferably is provided at its lower end 84 with a pair of oppositely inclined intersecting frusto-conical surfaces 86 and 88. The upper section 86 tapers outwardly as shown in Fig. 1 to provide a gradually expanding flow path for the flue gases conforming to the over all orifice contour through the burner 50. The purpose of the inwardly directed lower section 88 is to direct combustion air into the combustion zone into intimate contact with the flue gases and combustible hydrocarbon gases.

Within the section 20, the secondary combustion of undesired contaminants present in the flue gases takes place in a whirling substantially fixed luminous flame zone 60, and at a temperature ranging from about 1000° F. to 1500° F. Accordingly, the vertical dimensions of the combustion section 20 must be sufficient to completely encompass this flame zone without possibility of the flame extending thereabove. As it has been found that a proper secondary combustion occurs in a flame zone having a linear dimension of at least one, but not more than five times the flame diameter, the combustion section should have a vertical height at least five times its interior diameter, and preferably about 8 to 10 times such diameter. As a result of this construction, and the indicated dimensions of the flame zone relative to the orifice, the period of contact and secondary combustion of the flue gases ranges from about 0.05 to about 0.20 seconds. At flame temperatures of 1000° F. to 1500° F., this period of contact achieves a unique virtually complete combustion and removal of the undesired contaminant matter in the flue gases.

The operation of the secondary combustion device of the invention, in removing contaminants and the like from flue gases, will now be described:

Assuming an incinerator or other primary combustion system to be in operation and flue gases ascending in the stack 12 at a rate of anywhere from 20 to 50 feet per second, expansion of the flue gases into the chamber 28 will cause a rapid deceleration and settling out of the heavier particulate matter being carried along by the flue gases. Such particulate matter generally tends to return down the stack adjacent the stack wall, although any matter collecting on the floor of the chamber 28 may be conveniently removed through the clean-out door 32. The gases passing from chamber 28 about the baffle 30 increase in speed as they approach the orifice 36 through the mixing or orifice section 18. In the orifice 36, the gases approach a rate of ascent approximating 45 to 60 feet per second and consequently cause a draft inducing a flow of combustion air inwardly through the annular inlet 38. Simultaneously, the jet elements 62 of the burner cause intermixed air and combustible gases to be rapidly whirled upwardly into the zone 60 where, upon being ignited, they produce a luminous flame that completely occupies and blankets the exit flow pass of the flue gases through the combustion section 20. A unique effect of this rapid whirling of the luminous flame is to achieve a vertical rate of ascent of the flue gases through the zone substantially less than the rate of linear movement of the flue gases into the zone so that both intimate flame contact and prolonged combustion results. By properly proportioning the amount of air and hydrocarbon gases impelled into the flame zone 60, vertical dimensions of the flame zone and times of combustion of the flue gases may be achieved which virtually assure removal of smoke, fumes or smog-producing contaminants.

To those skilled in the art to which this invention relates, widely differing procedures, embodiments and applications of the invention will suggest themselves without departing from the spirit and scope of the invention. The disclosures and description herein are purely illustrative and are not intended to be in any sense limiting.

I claim:

1. In an afterburner of a type particularly adapted for use with existing stack constructions, whereby the escape of smoke and other undesirable products of combustion normally present in flue gases may be effectively inhibited: means defining a vertically extending flow path, said flow path including an expansion chamber having a transversely extending baffle to cause initial settling of entrained contaminants and an orifice; aperture means radially adjacent said orifice providing an annular inlet for gases containing oxygen; burner means positioned between said annular inlet and orifice for admitting combustible gases, said burner means including a series of jet elements arranged annularly about said orifice so as to direct said combustible gases into and upwardly whirling, substantially helical path; and means for igniting said gases to thereby provide a secondary combustion flame that completely occupies a substantial portion of said flow path.

2. The device of claim 1 wherein each of said jet elements is arranged at an angle relative to an intersecting diameter of said orifice between about 20° to about 50°.

3. The device of claim 1 wherein each of said jet elements is arranged at an angle relative to a plane perpendicular to the axis of said orifice between about 30° and about 60°.

4. An afterburner device of a type particularly adapted to inhibiting the emission of smoke and other smog-producing contaminants by incinerators and the like, comprising: wall means engageable with a stack outlet defining a vertically extending flow path, said means including an orifice; annular burner means positioned in said orifice; means supplying combustible gases to said burner means; aperture means radially adjacent said orifice and burner means providing an annular inlet for secondary combustion air; and means for igniting said combustible gases, said burner means including a series of annularly spaced jet elements each disposed at substantially the same inward and upward angle relative to a cylinder of revolution passing through said orifice, said wall means defining an expansion zone of enlarged cross-sectional area below said orifice, a transversely extending baffle being provided centrally of said expansion zone to cause initial settling of entrained particulate matter, whereby flue gases, air and ignited combustible gases drawn through said orifice move into a rapidly whirling, substantially fixed flame zone at a relatively slow rate of ascent.

5. An afterburner device of a type particularly adapted to inhibiting the emission of smoke and other smog-producing contaminants by incinerators and the like, comprising: wall means engageable with a stack outlet defining a verticaly extending flow path, said wall means including a frusto-conical section tapering upwardly to an orifice; annular burner means positioned in said orifice; means supplying combustible gases to said burner means; aperture means radially adjacent said orifice and burner means providing an annular inlet for secondary combustion air, said aperture means being adjustable to regulate the area of said inlet; and means igniting said combustible gases, said burner means including a series of annularly spaced jet elements each disposed at substantially the same inward and upward angle relative to a cylinder of revolution passing through said orifice, each of said jet elements having a gas inlet including a gas orifice in fluid communication with said gas supply means and an air inlet downstream from said gas orifice for combustion air, whereby flue gases, air and ignited, combustible gases drawn through said orifice move into a rapidly whirling, substantially fixed flame zone at a relatively slow rate of ascent.

References Cited in the file of this patent

UNITED STATES PATENTS

| | | |
|---|---|---|
| 997,548 | Flynt | July 11, 1911 |
| 1,858,637 | McDonald | May 17, 1932 |
| 2,177,258 | Jares | Oct. 24, 1939 |